(12) United States Patent
Algreatly

(10) Patent No.: US 7,969,418 B2
(45) Date of Patent: Jun. 28, 2011

(54) 3-D COMPUTER INPUT DEVICE AND METHOD

(76) Inventor: Cherif Atia Algreatly, Newark, CA (US)

( * ) Notice: Subject to any disclaimer, the term of this patent is extended or adjusted under 35 U.S.C. 154(b) by 598 days.

(21) Appl. No.: 11/564,882

(22) Filed: Nov. 30, 2006

(65) Prior Publication Data
US 2008/0129682 A1     Jun. 5, 2008

(51) Int. Cl.
*G09G 5/00* (2006.01)
*G09G 5/08* (2006.01)
(52) U.S. Cl. .................. 345/163; 345/156; 345/169
(58) Field of Classification Search .......... 345/156, 345/157, 163, 167, 184, 161, 164
See application file for complete search history.

(56) References Cited

U.S. PATENT DOCUMENTS

| | | | | |
|---|---|---|---|---|
| 5,910,798 A | * | 6/1999 | Kim | 345/163 |
| 2003/0142065 A1 | * | 7/2003 | Pahlavan | 345/156 |
| 2006/0250353 A1 | * | 11/2006 | Yasutake | 345/156 |

* cited by examiner

*Primary Examiner* — Duc Q Dinh

(57) ABSTRACT

A 3-D computer input device to provide position information to a computer system in three dimensions is disclosed. Said 3-D computer input device is comprised of five buttons each one capable of generating one signal when it is touched by the user's finger, each two different succeeding touches represent a motion in a positive or negative direction along an axis, or represent a clockwise or anti-clockwise rotation about one axis. Accordingly, 12 different succeeding touches represent motion in six degrees of freedom. The five buttons are coupled to a chassis which is suitable for a user to grasp with one hand or to put it on a finger ring, or to be attached to a keyboard, portable hand-held device, game controller, or the like.

19 Claims, 4 Drawing Sheets

| Movement | | | |
|---|---|---|---|
| No. | Direction | A | B |
| 1 | x | -x | x |
| 2 | -x | x | -x |
| 3 | y | -y | y |
| 4 | -y | y | -y |
| 5 | z | z | y |
| 6 | -z | z | -y |

FIG. 4

| Rotation | | | |
|---|---|---|---|
| No. | Direction | A | B |
| 1 | x Clockwise | y | y |
| 2 | x Anti-clockwise | -y | -y |
| 3 | y Clockwise | x | x |
| 4 | y Anti-clockwise | -x | -x |
| 5 | z Clockwise | y (As example) | x |
| 6 | z Anti-clockwise | x (As example) | y |

FIG. 5

| No. | A | B |
|---|---|---|
| 1 | x | z |
| 2 | -x | z |
| 3 | z | x |
| 4 | z | -x |
| 5 | Y | z |
| 6 | -Y | z |
| 7 | z | z |

3-D COMPUTER INPUT DEVICE AND METHOD

CROSS-REFERENCE TO RELATED APPLICATION

None

BACKGROUND

The multidimensional input device, U.S. Patent No. 20060250353, which was published in Nov. 9, 2006, is the most recent computer input device that provides positional information in three dimensions to the computer system, where said device is comprised of three sensors, where each sensor is comprised of two controls and each control is comprised of two buttons or two different positions to press on. When said multidimensional input device is used as a computer mouse, the user has 12 buttons or different positions to choose from, evenly distributed in three groups (on the left side, right side, and top side), each group allowing for four directions, and requiring the use of three fingers at all times.

There are many disadvantages in both function and form in said multidimensional input device, some of which are: using 12 buttons or positions to choose from in an input device such as a mouse to provide input to the computer system is very confusing to the user, relegating the mouse into a miniature keyboard; using three fingers simultaneously reduces the speed of user input especially in interactive applications such as games or virtual reality, where a fast response from the user is needed; the direction of moving the computer cursor or object on the computer screen is different from the direction of pressing the button on the mouse, making the movement counterintuitive; and said multidimensional input device uses only the Cartesian coordinate system where it is hard to navigate or move freely in three dimensions using such a system.

The proposed invention solves all the mentioned disadvantages of the previous art where this proposed invention utilizes 5 buttons instead of 12 buttons, requiring the use of one finger instead of 3 fingers, which accordingly facilitates and speeds the user's input to the computer system. The arrangements of the five buttons in this invention matches the intuitive movement or rotation on/about the x, y, z-axis of the Cartesian coordinates system to eliminate any confusion between the user's finger moving or rotating on the proposed device and the cursor's or object's corresponding movement or rotation on the computer display. Moreover, the proposed invention introduces a new method to utilize the spherical coordinate system, the polar coordinate system, the cylindrical coordinate system, and the Cartesian coordinate system to be used with this proposed invention in a simple and innovative technique.

SUMMARY

In one embodiment of this present invention, a 3-D computer input device can comprise a first button, a second button, a third button, a fourth button, a fifth button, and a chassis. Said five buttons, as seen in FIG. 1, are suitable for operation by finger and each one of them is capable of generating a signal when it is touched by the finger. The first button represents the positive direction of the x-axis, the second button represents the negative direction of the x-axis, the third button represents the positive direction of the y-axis, the fourth button represents the negative direction of the y-axis, and the fifth button represents the positive and negative direction of the z-axis. The five buttons can be coupled to the chassis which is suitable for a user to grasp with one hand or put on in a finger ring.

The 5 buttons are to be placed on the top of a computer input device to be accessible to the user's pointing finger. The 5 buttons are positioned to match their axial directions. The first, second, third, and fourth buttons are placed in a cross arrangement to represent respectively the x, -x, y, and -y directions of the Cartesian coordinate system, and the fifth button is to be placed in the center of the cross at the origin of the Cartesian coordinate system, where this arrangement matches the triple axis of the Cartesian coordinate system when seen from a top view directly above the origin.

To provide immediate input to the computer system to represent the six degrees of freedom, the user needs to press on two specific buttons in succeeding order. Each successive button-pressing for two different buttons represents a motion in a positive or negative direction along an axis, or represents a rotation anti- or clockwise about one axis.

Accordingly, 12 different successive touches represent motion in six degrees of freedom. Moving the user's finger to press on any two buttons that are assigned to a specific degree of freedom logically matches the cursor or object movement or rotation on the computer display as will be described subsequently.

In certain alternate embodiments, the chassis can be a regular mouse such as optical mouse to be moved on a surface to provide immediate input to the computer system, where in such cases the 5 buttons can provide six degrees of freedom to move or rotate in three dimensions and the surface mouse movement can provide the regular mouse input to be used in two dimensions where in such case the user has the option to move in two or three dimensions using one input device.

In further embodiments, the six degrees of freedom can be represented by movement in an x-y-z plane and rotation around the x, y, and z-axis. In one embodiment, the first degree of freedom can be represented by movement along the x-axis. The second degree of freedom can be represented by movement along the y-axis. The third degree of freedom can be represented by movement along the z-axis. The fourth degree of freedom can be represented by rotating about the x-axis. The fifth degree of freedom can be represented by rotating about the y-axis. The sixth degree of freedom can be represented by rotating about the z-axis.

In some embodiments, the chassis can be integrated into a keyboard, a laptop computer, a joystick, a game controller, or any other computer input device.

In other embodiments, the chassis can be integrated into a finger ring where the user puts it on his/her pointing finger or middle finger and uses the thumb finger to operate the 3-D computer input device where in such cases a wireless 3-D input device is used to enable the user to move around while s/he is using the computer.

In further embodiments, the computer input device can further comprise a USB connector for providing the input control signals to a computer. In additional embodiments, the device can be comprised of user programmable buttons and an LCD screen.

In addition to the aspects and embodiments described above, further aspects and embodiments will become apparent by reference to the drawings and by study of the following descriptions.

BRIEF DESCRIPTION OF THE DRAWINGS

The embodiments that are illustrated in referenced figures of the drawings are intended to be considered illustrative rather than limiting.

FIG. 4 illustrates six different alternatives of pressing two successive buttons to move in a positive or negative direction along one of the three axes of the Cartesian coordinate system.

FIG. 5 illustrates six different alternatives of pressing two succeeding buttons or pressing the same button twice to rotate clockwise and anti-clockwise about one of the three axes of the Cartesian coordinate system.

DETAILED DESCRIPTION

The present invention provides immediate three dimensional input to the computer system in a simple and intuitive way where the number of buttons, sensors, or the like is more minimal than the prior art. Beyond that, the invention is able to achieve important tasks that are hard to be achieved in the prior art as will be described subsequently.

Figure 1:
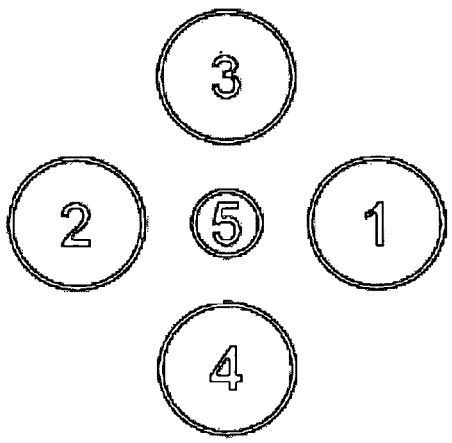
FIG. 1 illustrates the arrangement of the five buttons of the computer input device in cross shape.
Figure 2:
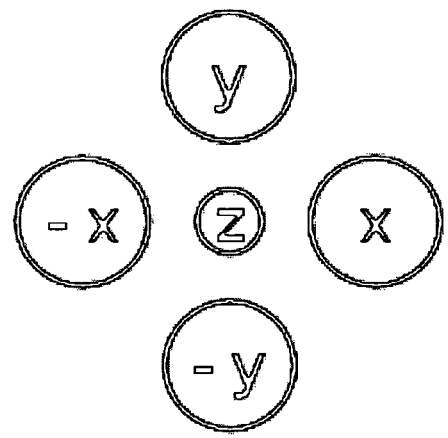
FIG. 2 illustrates the assignment of each button of the 5 buttons where they match the position of the x, −x, y, and −y directions and the origin of the Cartesian coordinate system.

As discussed above and illustrated in FIGS. 1 and 2, the present 3-D computer input device is comprised of five buttons, whereas the first button represents the positive direction of the x-axis, the second button represents the negative direction of the x-axis, the third button represents the positive direction of the y-axis, the fourth button represents the negative direction of the y-axis, and the fifth button represents the positive and negative directions of the z-axis.

Figure 3:
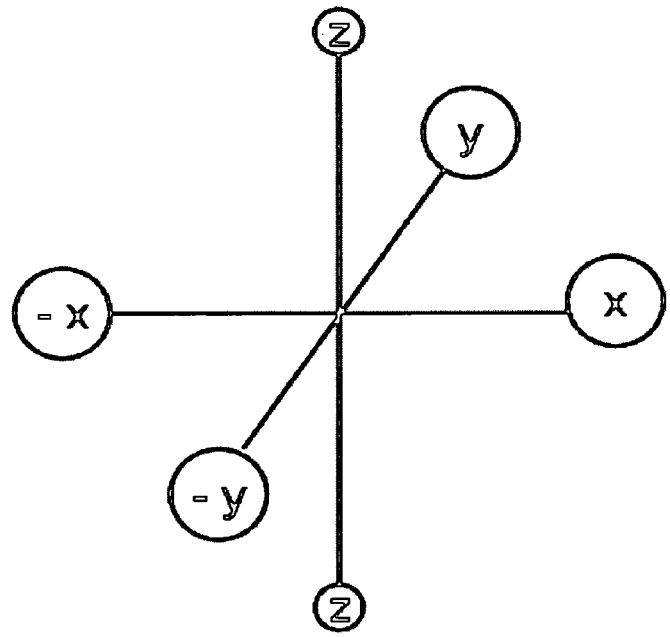
FIG. 3 illustrates a perspective view for the three axes of the Cartesian coordinate system where it is clear that the top view of this figure is represented in the 5 button arrangement of FIG. 2

The first, second, third, fourth, and fifth button are positioned in a cross shape where the first button is on the right horizontal part of the cross, the second button is on the left horizontal part of the cross, the third button is on the top vertical part of the cross, the fourth button is on the bottom vertical part of the cross, and the fifth button is on the intersection of the horizontal and vertical parts of the cross. This arrangement matches the top view of the three axes x, y, and z of the Cartesian coordinate system as shown in FIG. 3.

To operate the present input device, the user needs to touch two specific buttons successively in order to provide the computer system with one of 12 alternatives, where the first 6 alternatives represent the movements along the x, y, and z-axis in the positive or negative directions, and the remaining 6 alternatives represent clockwise or anti-clockwise rotation about one of the three axes x, y, or z of the Cartesian coordinate system.

FIG. 4 illustrates a table that shows the first 6 alternatives of pressing on two of the 5 buttons to move along the x, y, or z-axis, where the letter A in the table indicates the first pressing of the user's finger and the letter B in the table indicates the second pressing of the user's finger. As shown, pressing the second button, which is assigned for −x, then pressing the first button, which is assigned for x, represents a motion translation in the positive direction along the x-axis. Pressing the first button, which is assigned for x, then pressing the second button, which is assigned for −x represents a motion translation in the negative direction along the x-axis. Pressing the fourth button which is assigned for −y, then pressing the third button which is assigned for y represents a motion translation in the positive direction along the y-axis. Pressing the third button which is assigned for y, then pressing the fourth button which is assigned for −y represents a motion translation in the negative direction along the y-axis. Pressing the fifth button which is assigned for z, then pressing the third button which is assigned for y represent a motion translation in the positive direction along the z-axis. Pressing the fifth button which is assigned for z, then pressing the fourth button which is assigned for −y represents a motion translation in the negative direction along the z-axis.

The previous operation of moving the user's finger logically matches the motion or translation along the x, y, and z-axis, where to move in the positive direction of the x-axis, the user moves his finger horizontally from "left" to "right". To move in the negative direction of x-axis, the user moves his/her finger from "right" to "left". To move in the positive direction of y-axis, the user moves his/her finger vertically from "down" to "up". To move in the negative direction of y-axis, the user moves his/her finger vertically from "up" to "down". To move in the positive direction of z-axis the user moves his/her finger vertically from "down" to "up". To move in the negative direction of z-axis the user moves his/her finger vertically from "up" to "down". To make the user distinguish the difference between moving in y or z-axis, the height of the z button is different from the other four buttons as will be described subsequently.

FIG. 5 illustrates a table that shows the second 6 alternatives of pressing two of the 5 buttons to rotate about the x, y, or z-axis, where twice pressing the third button, which is assigned for y, represents a clockwise rotation about the x-axis. Twice pressing the fourth button, which is assigned for −y, represents an anti-clockwise rotation about the x-axis. Twice pressing the first button which assigned for x represents a clockwise rotation about the y-axis clockwise. Twice pressing the second button, which is assigned for −x, represents an anti-clockwise rotation about the y-axis. Pressing the third button, which is assigned for y, then pressing the first button, which is assigned for x, represents a clockwise rotation about the z-axis. Pressing the first button, which is assigned for x, then pressing the third button, assigned for y, represents an anti-clockwise rotation about the z-axis.

To rotate about the z-axis there are more plurality of alternatives that are not stated in the previous table. These additional alternatives can be recognized easily by rotating the user's finger clockwise or anti-clockwise around the z button pressing on any two buttons in successive order, for example pressing on the y button then the −x button or vice versa, pressing the −x button then the −y button or vice versa, or pressing on the −y button then the x button or vice versa represents clockwise or anti-clockwise rotating about the z-axis.

Obviously the previous operation of moving the user's finger logically matches the sense of rotating about the x, y, and z-axis, where the double-pressing gives the user the feeling of exercising additional weight on specific sides of the 3D cross of FIG. 3 to make this point rotate around the x, or y-axis, while rotating about the z-axis by moving the user finger anti- or clockwise around z button giving the user a perfect sense of rotating about the z-axis, clockwise or anti-clockwise.

This intuitiveness in moving along or rotating about the x, y, z-axis matches human nature in sensing the three dimensional directions while using the present 3-D computer input device, in addition to spending a minimal time to get used to mastering the 3-D input device.

Figure 6:
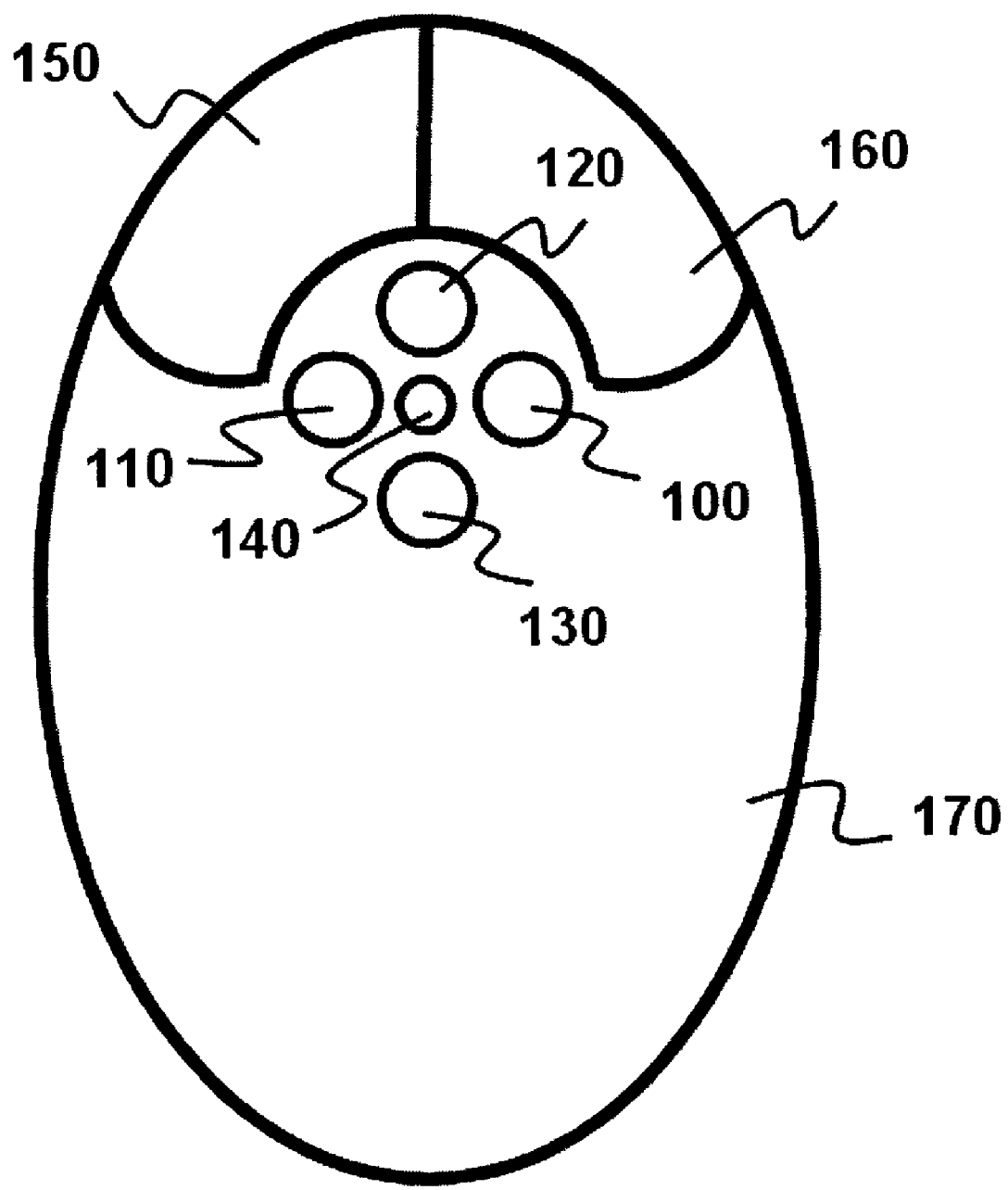
FIG. 6 illustrates an alternative for positioning and configuring the 5 buttons on the top of a mouse body, in accordance with an exemplary embodiment.

FIG. 6 illustrates positioning the five buttons of the present invention on the top side of a mouse where the first button 100, the second button 110, the third button 120, the fourth button 130, and the fifth button 140 are located close to the regular left mouse button 150 and the regular right mouse button 160, whereas in this example, the mouse's body 170 is the chassis of the computer input device.

Figures 7, 8:
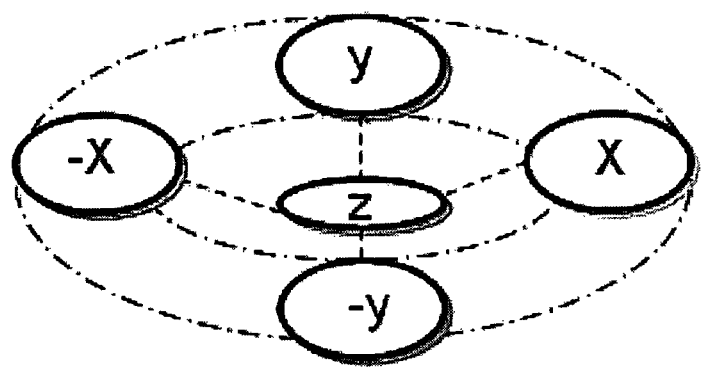
FIG. 7 illustrates the height difference between the first, second, third, and fourth buttons and the fifth button to avoid hitting the fifth button when moving from the first to second button, or when moving from the third to the fourth button.
FIG. 8 illustrates the seven other statistically probable combinations with both single and multiple button alternatives.

FIG. 7 illustrates the first, second, third, and fourth button where they are further elevated than the fifth button. This is to achieve two goals: the first goal is to avoid hitting the fifth button by mistake while moving the user's finger from the x button to the −x button, or from the y button to the −y button, or vice versa, and the second goal is to give the user a sense for moving along the z-axis when moving "up" or "down" as described previously.

FIG. 8 illustrates a table that includes 7 alternatives for pressing two buttons where these alternatives were not used previously. Such available alternatives enable the user to have more options to be used in his/her applications; such possibilities can be utilized by software companies that create new features for their software and need a shortcut from the input device to handle such features.

One innovative application for the present 3-D computer input device is to control the cursor movement on the computer display in three dimensions using the spherical coordinate system instead of the Cartesian coordinate system. To do so, one of the 7 alternatives of the table of FIG. 8, such as alternative number 7 which indicates twice pressing on the z button, will be used to give a signal for changing the coordinates system, where such double presses the z button will generate a signal for the computer system indicating that the spherical coordinate system is being used, and pressing twice again on the z button generates a signal for the computer system that indicates that the Cartesian coordinate system is being used instead of the spherical coordinate system.

The spherical coordinate system utilizes three components that are different from the x, y, and z components of the Cartesian coordinate system, where in the spherical coordinate system a point (P) is represented by a tuple of three components ($\rho$, $\theta$, and $\phi$). Where $\rho$ is the distance between the point P and the origin, $\theta$ is the angle between the positive x-axis and the line from the origin to the point P projected onto the xy-plane, and $\phi$ is the angle between the z-axis and the line from the origin to the point P.

Accordingly; to provide the input of $\theta$ to the computer system, the user will choose the same button pressings that were used to rotate about the z axis as described previously and shown in FIG. 5. To provide the input of $\phi$ to the computer system, the user will choose the same button pressings that were used to move along the z-axis as described previously and shown in FIG. 4. To provide the input of $\rho$ to the computer system the user will choose the same button pressings that were used to move along the x-axis as described previously and shown in FIG. 4.

The polar coordinate system is a special case of the spherical coordinate system where in this case the value of $\phi$ is equal to zero. However, the polar coordinate system can be utilized using the present 3-D computer input device by providing only the two input values of $\theta$ and $\rho$ to the computer system as described previously.

The cylindrical coordinate system is a three dimensional polar coordinate system where the height (h) of the polar coordinate plane is defined, accordingly to provide the three components h, $\theta$, and $\rho$ of the cylindrical coordinate system to the computer system. The user will first provide the value of h by using the alternatives No. 3 and 4 of the table of FIG. 8, to respectively provide the positive and negative h values to the computer system; the user then provides the two values of $\theta$ and $\rho$ as described previously.

Overall the present invention of the 3-D computer input device can be incorporated into PC keyboards, laptops, portable hand-held devices, game controllers, or the like to enable the user to move, rotate, navigate, or edit in three dimensions in different applications such as virtual reality, games, 3D modeling, online world mapping, GPS, three dimensional computer interfaces such as Microsoft Windows Vista, and many other medical and educational applications.

A variety of sensors can be employed in conjunction with the 5 buttons of the 3-D computer input device to provide the computer system with the needed input signals or data, where there are various sensors capable of providing such input signals. One alternative is to use an analog sensor with its printed circuit board ("PCB") as known in the art, where in this case, the PCB will process raw analog signals and convert them into digital signals that can be used for the microprocessor of computer system. In this case, as long as the user is touching the analog sensor, the sensor continuously generates specific data corresponding to the finger force and its position. The computer system utilizes the amount of time of pressing on any of the 5 buttons as a value for the movement distance along the x, y, or z-axis or as a value for the rotation angle about the x, y, or z-axis.

It is also possible to utilize a 5-way digital button and its related PCB. The digital sensor provides five independent digital ON-OFF signals in the direction of North, East, South, West, and Origin where these directions are associated respectively with the third, first, fourth, second, and fifth buttons of the 3-D computer input devices. For example, if the user pressed on the first button of the 3-D computer input device, which is the "East" point of the digital button, then a (0,1,0,0,0) signal is generated, and if the user then pressed on the third button of the 3-D computer input device, which is the "North" button, then a (1,0,0,0,0) signal is generated. Accordingly the computer system translates these two button pressings as anti-clockwise rotation about the z-axis as defined in the table of FIG. 5 In this case the value of the rotation, which means the rotation angle depends on the amount of time the user will keep the third button pressed on the 3-D computer input device which is the "North" button, where the default is to return the digital sensors to the (0,0,0,0,0) state once the user releases.

As discussed above, a 3-D Computer Input Device and Method for facilitating manipulation in six degrees of freedom is disclosed. While a number of exemplary aspects and embodiments have been discussed above, those skilled in the art will recognize certain modifications, permutations, additions and sub-combinations thereof. It is therefore intended that claims hereafter introduced are interpreted to include all such modifications, permutations, additions and sub-combinations as are within their true spirit and scope.

The invention claimed is:
1. A computer input device comprising:
a chassis connected to a computer,
a set of at least five buttons arranged on said chassis, wherein a sequential activation of one or more buttons selected by a user from said set of buttons creates a single computer input signal, wherein said single computer input signal corresponds to a translational or rotational vector in the 3-dimensional Cartesian coordinate system, and, any translation along a 3-dimensional Cartesian axis can be specified by a successive activation of two buttons of said set of buttons and any rotation about a 3-dimensional Cartesian axis can be specified by a successive activation of one button of said set of buttons.

2. The device of claim 1 wherein the set of at least five buttons comprises a first button substantially positioned on the right horizontal line segment of an imaginary cross, a second button substantially positioned on the left horizontal line segment of said imaginary cross, a third button substantially positioned on the top vertical line segment of said imaginary cross, a fourth button substantially positioned on the bottom vertical line segment of said imaginary cross, and a fifth button substantially positioned on the intersection of the horizontal and the vertical lines of said imaginary cross.

3. The device of claim 2 wherein the chassis is integrated with a 2-dimensional mouse.

4. The device of claim 2 wherein the chassis is integrated with a keyboard.

5. The device of claim 2 wherein the chassis is integrated with a hand-held device.

6. The device of claim 2 wherein the chassis is integrated with a finger ring device.

7. A method of inputting motion information to a computing device comprising:

connecting an input device associated with a set of five or more buttons to the computing device;

sequentially activating one or more buttons selected from said set of buttons thereby creating a single input signal to the computing device; and interpreting said single input signal at the computing device as a translational or rotational input in the 3-dimensional Cartesian coordinate system, wherein any translation along a 3-dimensional Cartesian axis can be specified by a sequential activation of two buttons of said set of buttons and any rotation about a 3-dimensional Cartesian axis can be specified by a sequential activation of one of said set of buttons.

8. The method of claim 7 wherein the activation of each button of said set of buttons occurs for as long as the button is touched by a user's finger.

9. The method of claim 7 wherein each button of said set of buttons is functionally defined by an area on a touchpad associated with the computing device.

10. The method of claim 7 wherein each button of said set of buttons is functionally defined by an area on a touch screen associated with the computing device.

11. The method of claim 7 wherein each button of said set of buttons is functionally defined by a key selected from a keyboard associated with the computing device.

12. The method of claim 7 wherein each button of said set of buttons is functionally defined by a position on a multi-position switch associated with the computing device.

13. The method of claim 7 wherein each button of said set of buttons is functionally defined by an axis of a joystick associated with the computing device.

14. The method of claim 7 wherein each button of said set of buttons is functionally defined by an icon in a graphical user interface (GUI) of the computing device.

15. The device of claim 2 configured such that successively touching said second button, followed by said first button, provides the computer system with an input signal representing a translation along the positive x-axis;

successively touching said first button, followed by said second button, provides the computer system with an input signal representing a translation along the negative x-axis;

successively touching said fourth button, followed by said third button, provides the computer system with an input signal representing a translation along the positive y-axis;

successively touching said third button, followed by said fourth button, provides the computer system with an input signal representing a translation along the negative y-axis;

successively touching said fifth button, followed by said third button, provides the computer system with an input signal representing a translation along the positive z-axis;

successively touching said fifth button, followed by said fourth button, provides the computer system with an input signal representing a translation along the negative z-axis;

successively touching said third button twice provides the computer system with an input signal representing a clockwise rotation about the x-axis;

successively touching said fourth button twice provides the computer system with an input signal representing a counter-clockwise rotation about the x-axis;

successively touching said first button twice provides the computer system with an input signal representing a clockwise rotation about the y-axis;

successively touching said second button twice provides the computer system with an input signal representing a counter-clockwise rotation about the y-axis;

successively touching said first button followed by said fourth button, or said fourth button followed by said second button, or said second button followed by said third button, or said third button followed by said first button, provides the computer system with an input signal representing a clockwise rotation about the z-axis; and, successively touching said first button followed by said third button, or said third button followed by said second button, or said second button followed by said fourth button, or said fourth button followed by said first button, provides the computer system with an input signal representing a counter-clockwise rotation about the z-axis.

16. The device of claim 15 wherein the chassis is integrated with a 2-dimensional mouse.

17. The device of claim 15 wherein the chassis is integrated with a keyboard.

18. The device of claim 15 wherein the chassis is integrated with a hand-held device.

19. The device of claim 15 wherein the chassis is integrated with a finger ring device.

* * * * *